(12) United States Patent
Goller et al.

(10) Patent No.: US 8,114,188 B1
(45) Date of Patent: Feb. 14, 2012

(54) METHOD FOR ELIMINATING CARBON CONTAMINATION OF PRECIOUS METAL COMPONENTS

(75) Inventors: Martin H. Goller, Painted Post, NY (US); David M. Lineman, Horseheads, NY (US); Steven R. Moshier, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/871,245

(22) Filed: Aug. 30, 2010

(51) Int. Cl.
*C22B 11/02* (2006.01)
(52) U.S. Cl. .......................................... 75/633; 148/678
(58) Field of Classification Search .............. 430/108.1, 430/108.2, 108.21, 108.23; 399/159; 75/633; 148/678
See application file for complete search history.

(56) References Cited

U.S. PATENT DOCUMENTS 4,913,736 A * 4/1990 Gimzeski ......................... 75/631

\* cited by examiner

*Primary Examiner* — George Wyszomierski
*Assistant Examiner* — Tima M McGuthry Banks
(74) *Attorney, Agent, or Firm* — Kevin M. Able (57) ABSTRACT

In the formation of sheet material from molten glass, molten glass is formed in a melting furnace and transported through a precious metal delivery system to the forming apparatus. Disclosed herein is a method to eliminate carbon-containing contamination of individual components of the precious metal delivery system prior to their installation and use. The method comprises one or more heat treating steps in an oxygen-containing atmosphere prior to and/or during assembly of the component.

20 Claims, 5 Drawing Sheets

METHOD FOR ELIMINATING CARBON CONTAMINATION OF PRECIOUS METAL COMPONENTS

FIELD

This invention relates to a method for joining precious metal components, and more particularly for reducing gaseous blisters in molten glass that originate from carbon contamination of precious metal components of a glass making system.

BACKGROUND

Glass making system for delivering high quality glass in the manufacture of precision glass articles requires careful attention to the delivery systems. Such precision products can include optical lenses and glass panels for the manufacture of display devices.

The molten glass delivery systems for high precision products may typically be formed from precious metals, and usually platinum or platinum alloys such as a platinum rhodium alloy. Such precious metals, usually selected from the platinum group of metals, have high melting temperatures, and are less likely to contribute contaminants to the molten glass (melt) flowing through these "platinum" delivery systems. In many instances, individual components of a particular platinum delivery system, a finer for example, or a stirring vessel, are produced by joining multiple subcomponents. For example, a cylindrical tube might be formed by rolling several flat platinum plates into semicircular segments, then welding the segments to form the tube. In another example, stirrers for stirring the molten glass may be formed by welding individual stirring blades to a shaft. Even the shaft may be formed from multiple components.

In spite of the relatively benign behavior of platinum (or platinum alloy) when submerged within the corrosive molten glass, it has been found that some of these platinum components may be contributing to inadvertent contamination of the molten glass with gaseous inclusions, or blisters.

Blisters believed to originate from precious metal components, such as an apparatus for stirring molten glass, have been identified as a significant loss issue in the manufacture of glass sheet for LCD display substrates. The problem is especially prevalent during startup of a melting furnace, but has also been observed mid-campaign. Because the defects constitute greater than about 90% $CO_2$, the underlying problem is believed to be carbon contamination of the components. The carbon contamination may be present in the components as-received from the component manufacturer, or it might be introduced into the component during operation.

The following disclosure addresses method of treating individual components and/or sub-components prior to and during assembly to mitigate the formation of these gaseous inclusions.

SUMMARY

Disclosed herein are embodiments of methods to produce platinum-containing articles for use in a glass making system comprising no, or very small amounts (less than about 3 ppm) of carbon. Carbon content in an amount greater than about 3 ppm, and in some cases greater than 2 ppm, may result in the formation of $CO_2$ gas at the interface between the platinum and molten glass that produces bubbles in the molten material that persist, undesirably, into the final glass article. The carbon can come from a variety of sources, but most commonly occurs when carbon containing lubricants are used in the manufacture of platinum-containing sub-assemblies and assemblies. Platinum-containing components are often used in delivery systems for transporting the molten material from one location to another, or for processing the molten mass, such as homogenizing the material due to the high temperature resistant capabilities of the metal. Such articles may be formed from platinum, or a platinum alloy, such as, but not limited to platinum-rhodium alloys and platinum-iridium alloys. Conventional cleaning methods, such as washing with detergents, may not remove carbon that diffuses into the body of the platinum article. Therefore, other methods may be required to eliminate the carbon.

The molten glass may also be referred to as the glass melt or simply melt. It should be understood that glass as commonly understood comprises an elastic state, and that although the molten material produced by the melter is not at that point truly a glass, it is capable of forming a glass upon cooling, and those skilled in the art of glass making will understand the reference.

In accordance with one embodiment, a method of making a platinum-containing metallic component for use in a glass making system is described comprising providing a first platinum-containing metallic member and heating the first platinum-containing metallic member in a first heat treating step to a temperature of $\geq 1200°$ C., $\geq 1450°$ C., $\geq 1600°$ C. and in some instances $\geq 1650°$ C. in an atmosphere containing $\geq 20\%$ by volume oxygen. According to the present method, the component should be heat treated at the prescribed temperature for a period of time $\geq 12$ hours, $\geq 24$ hours, $\geq 36$ hours, $\geq 48$ hours and in some instances $\geq 72$ hours. For reduced heat treatment temperatures, for example in a temperature range $\geq 1200°$ C. but less than $1450°$ C., the heat treatment may be continued for longer periods of time than at higher temperatures. For example, the heat treatment can be continued for more than 12 hours if the heat treatment temperature is in the range between from $\geq 1200°$ C. but less than $1450°$ C. The time and temperature can be selected based on such factors as the expected level of carbon contamination and thickness of the platinum-containing parts.

If additional layers are to be formed, the method may further comprise coupling together the first platinum-containing metallic member and a second platinum-containing metallic member in an overlapping relationship to form an assembly with a first interstitial space formed between the first and second platinum-containing metallic members. This overlapping relationship may include overlapping one surface over another surface, such as one broad surface area of one the first platinum-containing member overlapping the broad surface area of another platinum-containing member. However, it may also include the simple attachment of one component to another component, even in an edge-wise fashion, for example, the attachment of a blade to a stirrer shaft.

In the instance where the first platinum-containing member is coupled to another platinum-containing member, the assembly resulting from the coupling can be heated treated after each such coupling. Each subsequent heat treating step includes heating the assembly to a temperature of at least $1200°$ C. for a period of time $\geq 12$ hours in an atmosphere containing $\geq 20\%$ by volume oxygen. However, the temperature may be selected to be $\geq 1200°$ C., $\geq 1450°$ C., $\geq 1600°$ C. and in some instances $\geq 1650°$ C. The heat treatment may be continued for a period of time $\geq 12$ hours, $\geq 24$ hours, $\geq 36$ hours, $\geq 48$ hours and in some instances $\geq 72$ hours.

The method may further comprise coupling together the first platinum-containing metallic member and a plurality of subsequent platinum-containing metallic members, and, as in the preceding paragraph, heat treating the first platinum-containing metallic member after the coupling of each subsequent platinum-containing metallic member at a temperature 1200° C. for a period of time≧12 hours in an atmosphere containing ≧20% by volume oxygen. However, the temperature may be selected to be ≧1200° C., ≧1450° C., ≧1600° C. and in some instances ≧1650° C. The heat treatment may be continued for a period of time≧12 hours, ≧24 hours, ≧36 hours, ≧48 hours and in some instances ≧72 hours.

In another embodiment, a method of making a platinum-containing component for use in a glass making system is disclosed comprising providing a first platinum-containing metallic member and a second platinum-containing member, coupling together the first platinum-containing member and the second platinum-containing member in an overlapping relationship to form an assembly with a first interstitial space formed between the first and second platinum-containing members and heating the assembly in a first heat treating step to a temperature of at least 1200° C. for a period of time≧12 hours in an atmosphere containing ≧20% by volume oxygen. However, the heat treatment temperature may be selected to be ≧1200° C., ≧1450° C., ≧1600° C. or ≧1650° C. The heat treatment may be continued for a period of time≧12 hours, ≧24 hours, ≧36 hours, ≧48 hours and in some instances 72 hours. The atmosphere may contain by volume≧30% oxygen, ≧40% oxygen, ≧50% oxygen, ≧60% oxygen, ≧70% oxygen, ≧80% oxygen, ≧90% oxygen or even ≧100% oxygen.

The method may further comprise coupling at least one additional platinum-containing member to the first or the second platinum-containing member after the first heating treating step, with a second interstitial space formed between the at least one additional platinum-containing member and the first or second platinum-containing member, and repeating the heat treating step. The assembly may, for example, comprise a hollow tube including a plurality of nested platinum-containing members.

The assembly may be a sub-assembly of a molten glass stirring apparatus. Alternatively, the assembly may be any component or sub-component of a platinum-containing article that contacts molten glass.

The method may further comprise lubricating either or both of the first platinum-containing member or the second platinum-containing member prior to or during the step of coupling the platinum-containing members together. For example, a lubricant is often used in the process of manufacturing and/or assembling individual components.

In still another embodiment, a method of eliminating carbon from a platinum-containing metallic member is disclosed comprising providing a first platinum-containing metallic member; contacting the first platinum-containing member or the second platinum-containing member with a carbon-containing material and heating the first platinum-containing metallic member subsequent to the contacting in a first heat treating step to a temperature of at least 1200° C. for a period of time 12 hours in an atmosphere containing ≧20% by volume oxygen to eliminate dissolved carbon from an interior portion of the first platinum-containing metallic member. However, the temperature may be selected to be ≧1200° C., ≧1450° C., ≧1600° C. or ≧1650° C. The heat treatment may be continued for a period of time≧12 hours, ≧24 hours, ≧36 hours, ≧48 hours or ≧72 hours. The atmosphere may contain by volume≧30% oxygen, ≧40% oxygen, ≧50% oxygen, ≧60% oxygen, ≧70% oxygen, ≧80% oxygen, ≧90% oxygen or even 100% oxygen.

The method may further comprise coupling together the first platinum-containing metallic member and a plurality of subsequent platinum-containing metallic members, and heat treating the first platinum-containing metallic member after the coupling of each subsequent platinum-containing metallic member at a temperature of at least 1450° C. for a period of time≧12 hours in an atmosphere containing ≧20% by volume oxygen. However, the heat treatment temperature may be selected to be ≧1200° C., ≧1450° C., ≧1600° C. or ≧1650° C. The heat treatment may be continued for a period of time≧12 hours, ≧24 hours, ≧36 hours, ≧48 hours and in some instances ≧72 hours. The atmosphere may contain by volume≧30% oxygen, ≧40% oxygen, ≧50% oxygen, ≧60% oxygen, ≧70% oxygen, ≧80% oxygen, ≧90% oxygen or even 100% oxygen.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Figure 1:
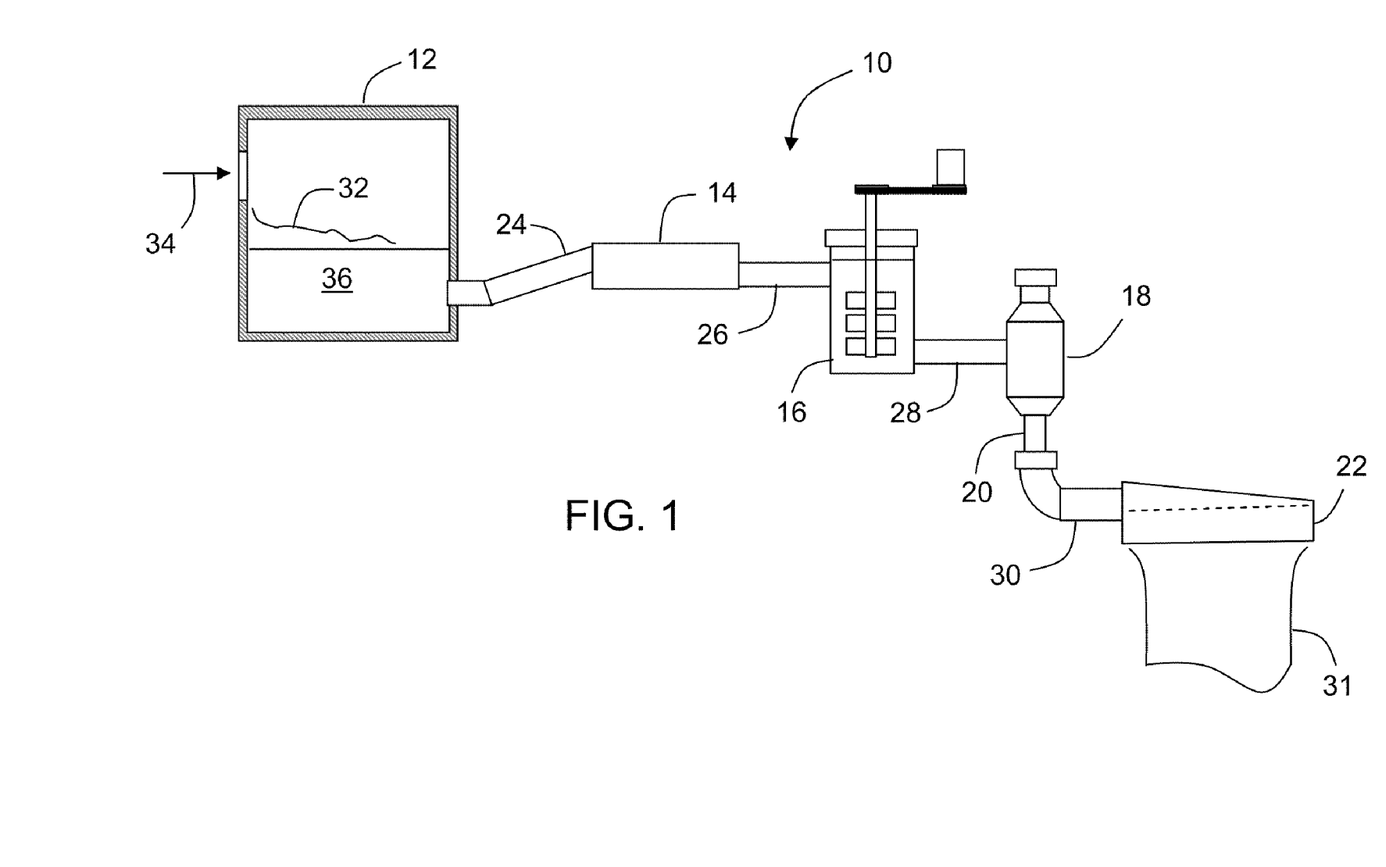
FIG. 1 is an elevational view in partial cross section showing an exemplary fusion downdraw process for the manufacture of glass sheet, and showing the platinum delivery system for transporting molten glass from the melting furnace to the forming body.

Shown in FIG. 1 is a side view of an exemplary glass making apparatus 10 comprising melting furnace or melter 12, finer 14, stirring apparatus 16, collection vessel 18, and downcomer tube 20 for supplying molten glass to a forming body 22 for producing a thin ribbon of glass. Finer 14 is connected to melter 12 through melter to finer connecting tube 24 and to stirring apparatus 16 through connecting tube 26. Collection vessel 18 is connected upstream to stirring apparatus 16 through connecting tube 28. Downcomer tube 20 is connected to collection vessel 18, and supplies molten glass to inlet 30 connected to forming body 22. Melter 12 is typically constructed from a refractory material, such as alumina or zirconia, and is supplied with batch material that is melted by, for example, a gas flame and/or an electric current passed between electrodes in the melter structure. Similarly, forming body 22 is also typically formed from a refractory material. In this instance, glass making apparatus 10 comprises a fusion downdraw system, so named because molten glass delivered to the forming body overflows both sides of the forming body as separate flows, then re-join or fuse at the bottom of the forming body as the molten glass is drawn downward by pulling rollers to produce a thin, pristine ribbon of glass 31. The ribbon may be cut at the bottom of the draw area into individual glass sheets. It should be noted, however, that the forming process itself may be replaced with just about any other forming process, as it is the delivery system, i.e. those precious metal components between the melter and the forming body, that are the subject of the present disclosure. These components include finer 14, stirring apparatus 16, collection vessel 18, downcomer tube 20, inlet 30 and connecting tubes 24, 26, and 28, and are collectively referred to herein as the platinum system, so-called because each of the components is formed from platinum or a platinum alloy metal such as a platinum rhodium alloy, or coated or clad with platinum or a platinum alloy. Moreover, while the present disclosure is presented in the context of the exemplary platinum system introduced above, the principals and teaching of the present disclosure is applicable any time platinum components are assembled for use in a glass making system. In addition, the present invention is not limited to a fusion glass making system, but may be applied to other glass making processes.

According to the exemplary fusion glass making system above, raw, batch materials 32, are sourced to the melting furnace (as indicated by arrow 34) where heat is applied to melt the individual constituents of the batch and form the molten glass 36. The batch materials typically include various metal oxides and other additives as required for a specific glass composition. The melter itself is typically formed from a refractory material, for example refractory bricks. The melting process produces, inter alia, various gases that are entrained into the molten glass and must be removed if a quality product is to be produced from the molten mixture. Thus, a fining step is included. For example, the molten glass can be flowed by gravity from melter 12 through connecting tube 24 to finer 14, where the temperature of the molten glass is raised. The increased temperature both decreases the viscosity of the molten glass, and causes certain fining agents (e.g. multivalent compounds such as arsenic oxide, tin oxide and/or antimony oxide) included in the batch material to release gas, e.g. oxygen bubbles. The gas released by the fining agent enters existing bubbles, causing them to grow and therefore rise through the glass melt faster. The increased temperature also results in a decrease in the viscosity of the molten glass that allows the bubbles to rise faster. Fining is achieved when the bubbles rise to a free surface of the molten glass and escape from the melt.

Once the molten glass has been fined, the molten glass is flowed through connecting tube 26 to stirring apparatus 16 comprising stirring vessel 38, stirrer 40 rotatably disposed in the stirring vessel. Molten glass flows into the stirring vessel 38 through stirring vessel inlet 42 and is stirred by stirrer 40. Stirrer 40 typically includes stirrer shaft 44 coupled to motor 46 through a drive mechanism (e.g., chain 48 and sprockets 50) and coupler 52. Stirrer 40 also includes blades 54 arranged on the shaft such that the blades are submerged in the molten glass during operation of the stirrer. Stirrer 40 homogenizes the molten glass, and removes and/or dissipates cord and other anomalies typically resulting from refractive index differences originating from compositional inhomogeneities. From stirring apparatus 16 the molten glass flows from stirring vessel outlet 56 through connecting tube 28 to collection vessel 18, and then through downcomer tube 20 to inlet 30 of forming body 22.

Each of the components of the platinum delivery system described above may be formed from smaller sub-components, and assembled, such as by welding. The following description will review assembly of stirrer 40, but it should be understood that the following principals can be applied to other components of the platinum system and are not limited to the stirrer or stirring apparatus.

Figure 2:
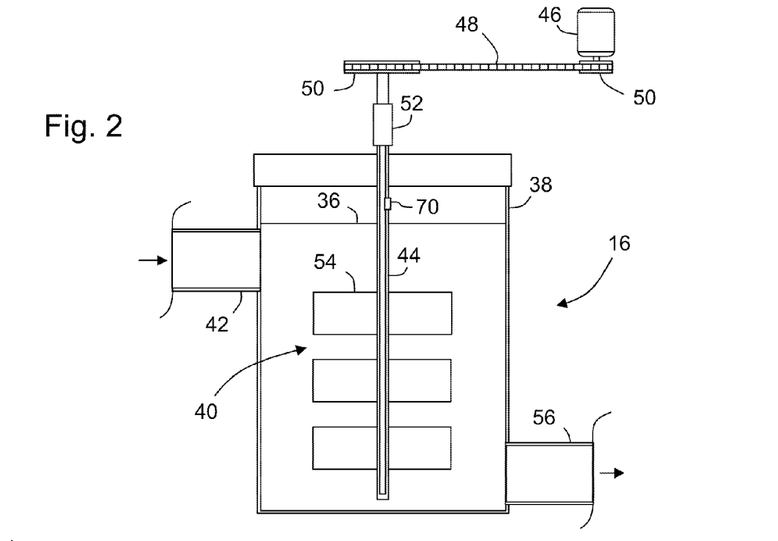
FIG. 2 is a cross sectional view of a stirring apparatus for homogenizing the molten glass as it flows through the platinum delivery system.
Figure 3:
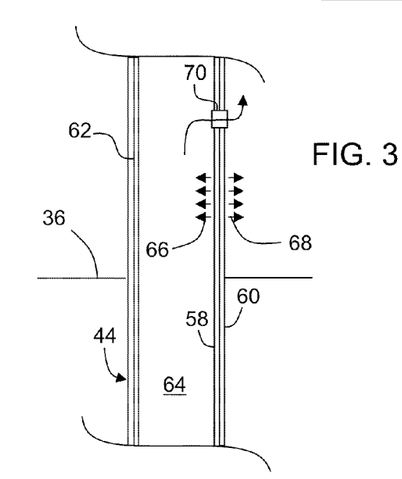
FIG. 3 is a close up cross sectional view of a portion of the shaft of a stirrer disposed in the stirring apparatus of FIG. 2.

FIG. 2 depicts a portion of shaft 44 comprising stirrer 40. As shown, shaft 44 is a hollow cylinder comprised of multiple layers of a platinum-containing metal that form the wall of the hollow cylinder. For example, the platinum-containing metal may be a platinum rhodium (Pt—Rh) alloy, such as 80% platinum and 20% rhodium. While two layers are shown, inner layer 58 and outer layer 60, shaft 44 may comprise more layers, as needed. Between the inner layer 58 and outer layer 60 is an interstitial space 62. During assembly of the shaft, the individual layers of the shaft are nested. Such nesting provides for increased strength, while allowing for the use of a hollow shaft that reduces the amount of expensive platinum. However, inner layer 58 and outer layer 60 are not substantially intimately joined. By not being substantially intimately joined what is meant is that the layers are primarily discrete, and not substantially joined by melting that would co-mingle the layers for example. The interstitial space may be only a few molecules thick in some instances, and need not be continuous. For example, shaft 44 can be formed by press fitting a first platinum-containing metal tube into a second platinum-containing metal tube, or by co-extrusion, which may leave a small interstitial space between the tubes. However, portions of the layers may be intimately joined such as by welding along edges of the layers (such as the top or bottom of the shaft) to ensure the integrity of the assembly, e.g. the shaft.

Figure 4:
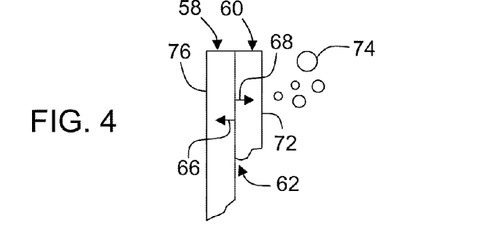
FIG. 4 is a close up cross sectional view of the portion of the shaft of FIG. 3, showing the several layers of precious metal comprising the stirrer shaft.

During manufacture of the individual layers of the shaft, various organic (carbon-containing) lubricants may be employed. For example, lubricants are routinely used during extrusion, rolling or pressing operations. Carbonaceous (carbon-containing) material comprising the lubricant can be trapped in the stirrer structure between the various layers of platinum-containing metal of the structure. In addition, carbon can end up being cold-worked into the article during its fabrication. At an operating temperature of the stirring apparatus, the carbon dissolves in the platinum-containing metal and diffuses through the stirrer shaft wall toward the hollow interior space 64 of the stirrer shaft, as indicated by arrows 66, and toward the melt, as indicated by arrows 68. Carbon that may interact with oxygen within the interior space 64 to form CO or $CO_2$ gas is released through vent 70 above the molten glass. Vent 70 also allows oxygen into the interior space where it can further react with the carbon. As best seen in FIG. 4, carbon diffusing in the opposite direction encounters oxygen from the glass melt stirrer-melt interface and reacts to form CO or $CO_2$ gas at the outer surface 72 of outer layer 60, and subsequently produces bubbles 74 that become entrained within the molten glass.

Figure 5:
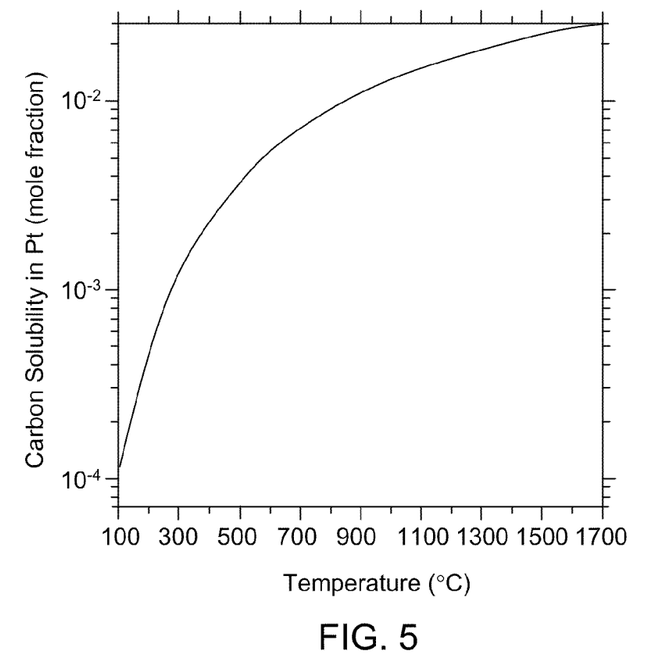
FIG. 5 is a graph showing the solubility of carbon in platinum as a function of temperature.

As shown in FIG. 5 depicting the solubility of carbon in platinum, carbon is quite soluble in Pt at stirrer operating temperatures (e.g. less than about 1500° C., depending on the glass composition), and with no intermediate phases. In addition, the diffusivity of carbon in Pt is reasonably high ($\sim 10^{-5}$ cm$^2$/s) at stirrer operating temperatures. For this mechanism to be responsible for observed $CO_2$ blisters, the flux of carbon through the Pt wall must be at least as high as the flux of carbon in the observed $CO_2$ blisters. For example, the concentration of carbon on interior surface 76 of stirrer shaft 44 needed to produce blisters has been calculated in some instances to be approximately 2 ppm, a level quite easily achieved.

Figure 6:
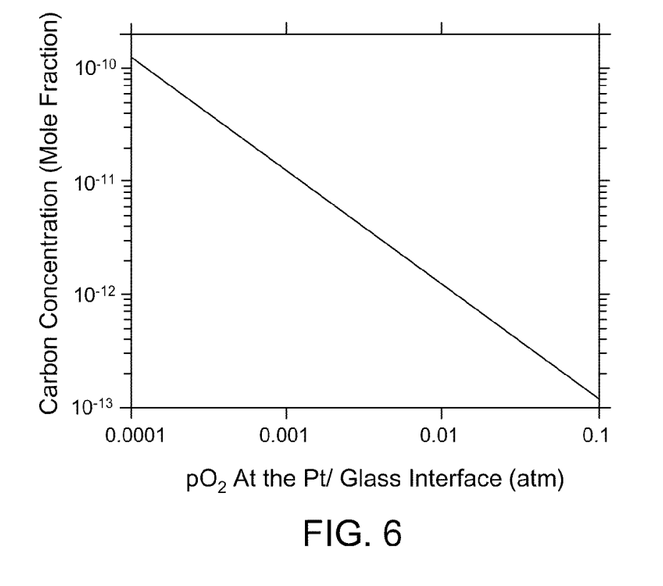
FIG. 6 is a graph showing the minimum concentration of carbon needed to achieve a partial pressure of $CO_2$ ($pCO_2$) equal to 1 atmosphere as a function of the partial pressure of oxygen ($pO_2$) in the platinum.

There is also a thermo-chemical criterion that must be met for carbon diffusion to be responsible for observed $CO_2$ blisters. To nucleate a $CO_2$ bubble, the partial pressure of $CO_2$ ($pCO_2$) must be greater than about 1 atmosphere. FIG. 6 shows the minimum concentration in mol fraction of carbon in Pt needed to achieve $pCO_2=1$ atm and nucleate a bubble as a function of the partial pressure of oxygen in the glass melt ($pO_2$) at 1425° C., a typical stirring apparatus operating temperature for display-type glass. It should be noted the $2\times10^{-13}$ value is strictly based on equilibrium conditions, whereas the 2 ppm value previously described is based on a kinetic or reaction rate.

To eliminate carbonaceous material from platinum-containing sub-components of the platinum system, one or more heat treating processes are applied to individual sub-assemblies. Again using the stirrer shaft as an example, once the two-layer structure comprising inner layer 58 and outer layer 60 has been assembled, such as by pressing a first platinum-containing hollow metal cylinder into a second platinum-containing hollow metal cylinder, the outside surfaces of the resulting first sub-assembly can be easily cleaned with a suitable solvent. However, the interstitial space (interface) between the first and second metal cylinders is not so easily cleaned, and may not even be accessible, and any lubricant used in forming and/or assembling the layer structure that becomes disposed between the inner layer and the outer layer is virtually impossible to remove via conventional cleaning or washing methods.

To ensure the removal of any residual carbonaceous material, the first sub-assembly (e.g. nested inner layer 58 and outer layer 60) is heat treated by heating the sub-assembly to a temperature of at least 1200° C. for a period of time equal to or greater than 12 hours in an atmosphere containing equal to or greater than 20% by volume oxygen. The atmosphere may be air. Alternatively, the atmosphere may contain by volume $\geq$30% oxygen, $\geq$40% oxygen, $\geq$50% oxygen, $\geq$60% oxygen, $\geq$70% oxygen, $\geq$80% oxygen, $\geq$90% oxygen or even 100% oxygen. In some embodiments, the temperature can be as high as 1450° C., 1600° C. or even 1650° C. However, care should be taken not to cause oxidation damage to the sub-assembly, so the temperature and oxygen content should be appropriately balanced. For heat treatment steps conducted at lower temperatures, such as $\geq$1200° C., the time period may be longer than the time period under high temperature conditions. The selected time period for the heat treatment, based among other things on the thicknesses of the layers and the expected level of carbon contamination, can range from $\geq$12 hours, $\geq$24 hours, $\geq$36 hours, $\geq$48 hours and in some instances $\geq$72 hours.

Figure 7:
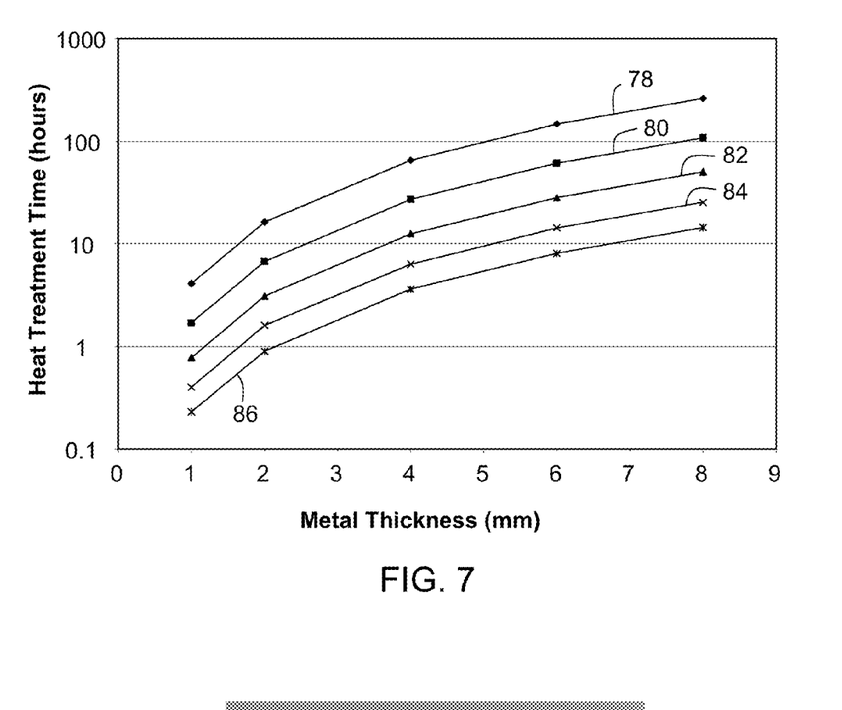
FIG. 7 is a graph indicating the length of heat treating time needed to remove carbon at an initial concentration of 1.1% to a concentration of 3 ppm as a function of metal thickness for a range of temperatures between 1100° C. and 1500° C.

In addition, the thickness of the platinum-containing sub-assembly, e.g. a thickness of a wall of the sub-assembly, should be considered. For example, FIG. 7 depicts the length of heat treating time to remove carbon from metal at an initial amount of 1.1% to a level of 3 ppm as a function of metal thickness for a range of temperatures between 1100° C. and 1500° C., i.e. 1100° C. (curve 78), 1200° C. (curve 80), 1300° C. (curve 82), 1400° C. (curve 84) and 1500° C. (curve 86). These curves are based on diffusion of carbon out of a metal slab and can be applied to each of the embodiments disclosed herein. It should be noted that a carbon concentration less than 1.1% would require less time for heat treating as that indicated.

Assuming an initial carbon concentration of 1.1% in platinum, which is near the saturation limit, the time needed to reach an average concentration of 3 ppm can be calculated using equation (1) below:

$$\frac{M_t}{M_0} = \sum_{n=0}^{\infty} \frac{8}{(2n+1)^2\pi^2} \exp(-D(2n+1)^2\pi^2 t/4L^2) \quad (1)$$

where $M_0$ is the initial amount of carbon in the platinum (e.g. 1.1%) and $M_t$ is the amount of carbon at a given time and D is the diffusion coefficient for carbon in Pt, in the range from about $10^{-7}$ to $10^{-5}$ cm$^2$/sec from 1100° C. to 1500° C. Substituting 3 ppm ($3\times10^{-4}$%) for $M_t$, equation (1) can be solved for the time t to get to 3 ppm.

If additional layers are to be added, the heat treating step above can be repeated for each additional layer, and/or a final heat treating step applied after the final layer has been added. Each heat treating step need not be the same time-temperature-oxygen content as a preceding heat treating step. The number of heat treating steps, and the time-temperature-oxygen content of each heat treating step, will depend on the particulars of the construction of the component being assembled.

Because carbon is reasonably soluble in platinum, even single layer platinum-containing metal articles can become contaminated with carbon during processing of the article. The carbon can diffuse into the platinum-containing article, where it is virtually impossible to remove by conventional cleaning solutions. It should be apparent, therefore, that, based on the preceding, the heat treating process need not be confined to the described multi-layer assembly, but can be applied to single layer platinum-containing metal articles prior to their assembly into more complex pieces, or, in the instance where the single-layer article is used as is, prior to its use in the glass making system. For example, a platinum-containing metal tube comprising only a single layer of platinum-containing metal can be heat treated by heating the single layer article to a temperature of 1200° C., 1450° C., 1600° C. or 1650° C. for a period of time equal to or greater than 12 hours in an atmosphere containing equal to or greater than 20% by volume oxygen. The atmosphere may be air. Alternatively, the atmosphere may contain by volume$\geq$30% oxygen, $\geq$40% oxygen, $\geq$50% oxygen, $\geq$60% oxygen, $\geq$70% oxygen, $\geq$80% oxygen, $\geq$90% oxygen or even 100% oxygen. In some embodiments, the temperature can be as high as 1600° C. or even 1650° C. However, care should be taken not to cause oxidation damage to the sub-assembly, so the temperature and oxygen content should be appropriately balanced.

EXAMPLE

Figure 8:
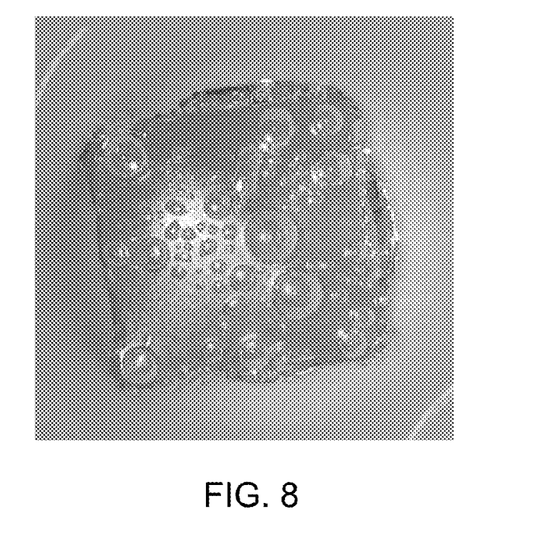
FIG. 8 depicts a non-heat treated platinum-rhodium alloy sealed pouch containing 10 mg of carbon that was immersed in a bath of molten glass for 24 hours at 1450 C and shows abundant blister formation.

A test sample (Sample 1) in the form of a pouch was produced from two 0.762 mm thick sheets of 90% Pt-10% Rh alloy. A 10 mg sample of carbon was sealed inside the pouch by welding the edges of the sheets. The sample was then immersed in a bath of molten glass (Eagle XG™ glass manufactured by Corning Incorporated) at 1450° C. for 24 hours. Sample 1 (FIG. 8) had no prior heat treatment of the platinum-rhodium metal according to the embodiments described herein prior to the immersion. FIG. 8 illustrates abundant generation of blisters (bubbles) at the surface of the sealed metal pouch resulting from the high temperature immersion.

Figure 9:
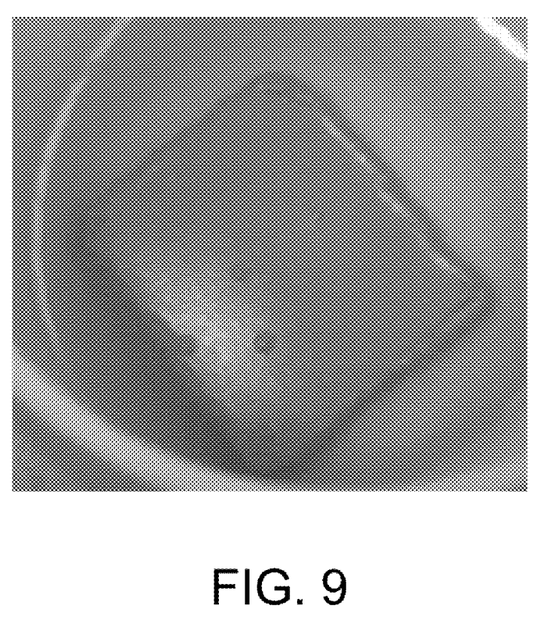
FIG. 9 depicts a platinum-rhodium alloy sealed pouch containing 10 mg of carbon that was heat treated for 168 hours at 1450° C., then immersed in a bath of molten glass for 24 hours at 1450° C., and shows a significant decrease in blister formation when compared to the sample of FIG. 8.

For comparison, another sample (Sample 2) was produced in a manner identical to the manner in which Sample 1 was made, and also had 10 mg of carbon disposed within the sealed pouch. Sample 2 was heat treated at 1450° C. for 7 days (168 hours) prior to immersing the sample in a bath of the molten Eagle XG™ glass, also at 1450° C., according to Sample 1. FIG. 9 shows Sample 2 after a 24 hour immersion in the molten glass at a temperature of 1450° C. Sample 2 shows a dramatic reduction in blister formation from the heat treated metal when compared with the blistering apparent from the non-heat treated metal (Sample 1 above).

It should be emphasized that the above-described embodiments of the present invention are merely possible examples of implementations set forth for a clear understanding of the principles of the invention. Many variations and modifications may be made to the above-described embodiments of the invention without departing substantially from the spirit and principles of the invention. For example, while the above description has been presented in terms of a stirrer shaft, the principals described can be applied to other single or multi-layer platinum-containing components of a glass making apparatus that come into contact with molten glass, including but not limited to single or double-walled tubes or pipes used to transport the molten glass from one location to another location, vessels for conditioning the molten glass, and sub-assemblies of certain components, such as stirrer blades coupled or uncoupled to the stirrer shaft. All such modifications and variations are intended to be included herein within the scope of this disclosure and the present invention and protected by the following claims.

What is claimed is:

1. A method of eliminating carbon from a platinum-containing metallic component for use in a glass making system comprising:
   providing a first platinum-containing metallic member comprising a concentration of carbon greater than 3 ppm; and
   heating the first platinum-containing metallic member in a first heat treating step at a temperature and for a period of time effective to reduce the concentration of carbon to less than 3 ppm.

2. The method according to claim 1, wherein the first platinum-containing metallic member is heated to a temperature $\geq 1200°$ C. for a period of time $\geq 12$ hours in an atmosphere containing $\geq 20\%$ by volume oxygen.

3. The method according to claim 2, wherein the first platinum-containing member is heated to a temperature $\geq 1450°$ C.

4. The method according to claim 2, wherein the first platinum-containing member is heated for a period of time $\geq 72$ hours.

5. The method according to claim 1, further comprising coupling together the first platinum-containing metallic member and a second platinum-containing metallic member in an overlapping relationship to form an assembly with a first interstitial space formed between the first and second platinum-containing metallic members.

6. The method according to claim 5, further comprising heating the assembly in a second heat treating step to a temperature of at least 1200° C. for a period of time $\geq 12$ hours in an atmosphere containing $\geq 20\%$ by volume oxygen.

7. The method according to claim 1, further comprising coupling together the first platinum-containing metallic member and a plurality of subsequent platinum-containing metallic members, and heat treating the first platinum-containing metallic member after the coupling of each subsequent platinum-containing metallic member at a temperature $\geq 1200°$ C. for a period of time $\geq 12$ hours in an atmosphere containing $\geq 20\%$ by volume oxygen.

8. The method according to claim 1, wherein the platinum-containing metallic component comprises a vessel, the method further comprising flowing molten glass through the vessel.

9. A method of making a platinum-containing component for use in a glass making system comprising:
   a. providing a first platinum-containing metallic member and a second platinum-containing member;
   b. coupling together the first platinum-containing member and the second platinum-containing member in an overlapping relationship to form an assembly with a first interstitial space formed between the first and second platinum-containing members, wherein the assembly comprises carbon in a concentration greater than 3 ppm; and
   c. heating the assembly in a first heat treating step at a temperature and for a period of time effective to reduce the concentration of carbon to less than 3 ppm.

10. The method according to claim 9, wherein the assembly is heated to a temperature $\geq 1200°$ C. for a period of time $\geq 12$ hours in an atmosphere containing $\geq 20\%$ by volume oxygen.

11. The method according to claim 9, wherein the assembly is heated to a temperature $\geq 1450°$ C. during the first heat treating step.

12. The method according to claim 9, wherein the assembly is heated for a period of time $\geq 72$ hours.

13. The method according to claim 9, further comprising coupling at least one additional platinum-containing member to the first or the second platinum-containing member after the first heating treating step, there being a second interstitial space formed between the at least one additional platinum-containing member and the first or second platinum-containing member, and repeating step c.

14. The method according to claim 9, wherein the assembly comprises a hollow tube comprising a plurality of nested platinum-containing members.

15. The method according to claim 9, wherein the atmosphere contains at least 30% oxygen.

16. The method according to claim 9, wherein the assembly is a sub-assembly of a molten glass stirring apparatus.

17. The method according to claim 9, further comprising lubricating the first platinum-containing member or the second platinum-containing member with a carbon-containing material prior to step b.

18. A method of making a stirrer for stirring molten glass comprising:

providing a first platinum-containing metallic member;

contacting the first platinum-containing member with a carbon-containing material; and heating the first platinum-containing metallic member subsequent to the contacting in a first heat treating step to a temperature $\geq 1200°$ C. for a period of time $\geq 12$ hours in an atmosphere containing $\geq 20\%$ by volume oxygen, and wherein the first platinum-containing member comprises carbon in a concentration less than 3 ppm after the heating.

19. The method according to claim 18, further comprising coupling together the first platinum-containing metallic member and a plurality of subsequent platinum-containing metallic members, and heat treating the first platinum-containing metallic member after the coupling of each subsequent platinum-containing metallic member at a temperature $\geq 1200°$ C. for a period of time $\geq 12$ hours in an atmosphere containing $\geq 20\%$ by volume oxygen.

20. The method according to claim 18, wherein the first platinum-containing metallic member is heated to a temperature $\geq 1450°$ C. during the first heat treating step.

* * * * *